Patented Oct. 3, 1944

2,359,343

UNITED STATES PATENT OFFICE 2,359,343

SILICATE ADSORBENTS

Charles C. Winding, Ithaca, N. Y., assignor to Tide Water Associated Oil Company, Bayonne, N. J., a corporation of Delaware No Drawing. Application November 14, 1941, Serial No. 419,089

9 Claims. (Cl. 252—300)

This invention relates to synthetic silicate compositions and to the preparation and use thereof in the industrial arts. In its broader and more general aspects, the invention is concerned with magnesium or magnesium-containing silicate compositions having adsorbent properties and especially adapted to the refining of liquids or solutions from which it is desired to remove coloring matter or other impurities which may be selectively adsorbed by an active solid refining agent. More particularly, the invention provides a magnesium or magnesium-containing silicate composition of active adsorbent character having physical properties necessary for use in the "percolation" method of refining liquids with solid adsorptive agents.

The silicate compositions here disclosed are formed by cation or base exchange between a suitable solid calcium-containing silicate material and an aqueous solution of a magnesium salt. Adsorbent silicate materials produced by similar cation or base exchange reaction are disclosed and claimed broadly in my copending application Serial No. 389,170, filed April 18, 1941. The present invention is concerned especially with use as the solid material employed in the exchange reaction of particular calcium-containing silicate compositions in the preparation of "exchange" magnesium silicate percolant adsorbents; and the instant application accordingly constitutes a continuation-in-part of my said copending application.

Solid adsorbent compositions, both of natural and synthetic origin, are used extensively in the removal of coloring matter or otherwise refining liquids and solutions. The treatment of petroleum fractions, especially viscous oils of lubricating character, is an important illustrative example of the use of adsorbents for the removal of undesired components or constituents.

Two distinct methods of refining liquids, such for example as lubricating oils, with solid adsorbent compositions are in general use. One of these is the procedure commonly designated as contact treatment, and the other is usually identified as percolation. The two operations differ radically in manipulative detail, each predicated upon and requiring a distinct type and form of adsorbent material.

In contact treatment, the adsorbent must be very finely divided, for example 200 to 300 mesh, and hardness or resistance to attrition is not a consideration. Such contact decolorizing material is agitated in a body of oil at elevated temperature for sufficient time to obtain the desired degree of refining, after which the decolorized oil is separated from the spent adsorbent, usually by filtration.

The percolation method requires a relatively coarse, granular adsorbent material and the percolant particles must have hardness to a degree at least sufficient to withstand breakdown or attrition loss in handling operations. In decolorizing oils by percolation treatment, a deep static bed of adsorbent material is provided through which the oil filters or percolates. When, by reason of adsorbing coloring matter from the oil, the adsorbent material shows diminished activity, oil flow is cut off. After draining and steaming in situ the adsorbent may be removed by a suitable conveyor system to a furnace, such as the familiar multiple hearth, rabble-arm type, and revivified by burning.

Thus, it will be apparent that preparation of a synthetic adsorbent involves consideration of its contemplated use. Depending upon whether the adsorbent is to be used in contact treatment or in a percolation method, distinct and different properties or characteristics are required. A given adsorbent material cannot be used alternatively as a contact agent or a percolant. Adsorbent compositions having the form and properties necessary for contact use have no utility in percolation methods of refining, while adsorbent material in percolant form will not function satisfactorily as a contact agent.

As indicated at the outset, the present invention concerns adsorbents adapted for use in percolation methods and a method whereby such adsorbents can be produced directly in percolant form.

In my aforesaid copending application Serial No. 389,170 I have described broadly and in certain specific embodiment such a method for the production of active magnesium silicate adsorbents in percolant form. In general aspect, that method includes the steps of preparing or providing a suitable calcium silicate and subjecting this in solid, sufficiently divided form to base exchange with a soluble magnesium salt in aqueous solution, thus producing an exchange magnesium silicate composition having percolant form and high oil decolorizing activity as such.

Considered in greater detail, the process disclosed in my said copending application involves the following general procedural steps:

(1) Precipitating under regulated conditions a calcium silicate material having desired physical properties.

(2) Filtering and sufficiently washing the precipitate.

(3) Drying the resulting filter-cake of calcium silicate material.

(4) Grinding the resulting dried material to suitable particle size.

(5) Subjecting the particles of calcium silicate material to a cation or base exchange reaction by treatment with an aqueous solution containing a soluble magnesium salt to exchange calcium ions of the silicate with magnesium ions and produce an "exchange" magnesium silicate composition.

(6) Filtering to remove excess liquids.

(7) Drying the resulting mass to obtain hard granular particles of exchange magnesium silicate adsorbent.

The method of the present invention also involves the general procedural steps of my copending application as set forth but is concerned primarily with use in step (1) of particular starting materials and, in addition, the use of certain controls and regulation factors in this and other steps of the method. In broad aspect, the present invention involves the preparation of a calcium-magnesium silicate having desirable hardness and other physical properties by reacting an alkali metal silicate with calcium and magnesium salts, and subsequently processing or treating the resulting calcium-magnesium silicate material by general procedural steps similar to those listed hereinabove to produce an exchange magnesium silicate percolant adsorbent.

It is an important feature and avantage common to the present invention and that of said copending application that desired characteristics, particularly form, physical structure and percolant decolorizing activity, in the final "exchange" adsorbent composition are predetermined and imparted in the steps, and by control of operating conditions, preceding the cation or base exchange reaction stage at which the percolant adsorbent product of the invention is produced. Viewed in another aspect, this feature embraces the concept that necessary physical properties and adsorbent activity of the percolant material produced in the base exchange operation of the process depend directly upon and are determined directly by the characteristics and properties of the precipitated material which enters the aforesaid base exchange reaction step.

More specifically, according to the present invention, there is provided by precipitation methods silicate compositions containing both calcium and magnesium, and having the physical form and characteristics desired for cation exchange reaction to produce an improved exchange magnesium silicate composition in percolant form. Such precipitated calcium-magnesium silicate is conveniently obtained by reacting in aqueous solution a soluble alkali metal silicate with soluble calcium and magnesium salts. In the precipitation step certain controls or factors are important to the production of a calcium-magnesium silicate of such properties that it can be converted to final exchange products of suitable or desired decolorizing activity. Certain of these factors or controls may vary with different uses for which the final product is intended and with specific properties desired in the final product. Likewise, certain factors or controls are interrelated and obtainment of particular properties in the final product may require dependent regulation of several factors.

By way of specific embodiment in the preparation of a percolant adsorbent adapted for use in the percolant oil decolorizing method, there is added to a hot (90° C.) aqueous solution of sodium silicate, preferably of high silica to soda ratio (as, for example, $SiO_2/Na_2O$ ratio=4), in 0.2 molar concentration (as to $Na_2O$ content thereof), a hot (90° C.) aqueous solution containing 30 mol per cent magnesium chloride and 70 mol per cent calcium chloride, the concentration of the latter solution being 0.2 molar (i. e., combined concentrations of $MgCl_2$ and $CaCl_2$). The reaction mass is maintained at about 90° C. until precipitation is complete. The reactant solutions may be agitated. The resultant slurry is then filtered, and the precipitate washed for sufficient removal of chlorides. The resulting filter-cake containing calcium-magnesium silicate is then subjected to drying.

In the drying operation sufficient liquid must be removed to produce a dried material which can be ground or otherwise reduced to suitable particle size. Drying conditions such as time and temperature may be varied as well as types of drying equipment to produce the stated degree of dryness, but in any case drying conditions destructive to the capacity of the dried material to be converted by exchange reaction to highly active final products should be avoided. Satisfactory drying of experimental batches is accomplished by placing the material in an ordinary laboratory muffle furnace heated to 500° C. and heating there'n for 3 hours. Drying under the latter specified conditions may result in dried material containing on the order of 4 to 14% total water (as determined by heating a sample thereof at 1000 to 1200° C. for two to three hours). Other drying conditions may be employed which will result in a dried product capable of being ground to desired particle size for conversion by exchange reaction to highly active exchange magnesium silicates.

The resulting dried calcium-magnesium silicate so produced is in the form of a mass of hard particles of varying size depending on the degree of subdivision of the cake charged to the dryer which is not readily powderable but which can be reduced by grinding or equivalent means to desired particle size. The requisite hardness and other desired physical properties and capacity for conversion by exchange reaction to highly active and otherwise satisfactory percolant adsorbents are imparted to the calcium-magnesium silicate by the foregoing precipitation step and stated treatment of the precipitate, and use therein of controlled or regulated conditions which will be more fully set forth.

The dried material is then ground to suitable particle size. Grinding may be accomplished by use of any suitable grinding equipment. Satisfactory results are obtained by use of a disc grinder having rotating and stationary disc grinding elements using free, rather than choked, grinding. Preferably the dried material is ground to percolant size, as for example 30–60 mesh, in order that percolant sized exchange magnesium silicate final product will be obtained directly in subsequent steps, as will be later explained.

The ground material is then desirably screened to remove fines and the calcium-magnesium silicate which is in the form of sized discrete particles of hard granular structure is subjected to cation or base exchange reaction which consists in treatment with a solution containing magnesium ions to exchange the latter with calcium ions of the silicate. This operation may be conducted in any suitable manner. One convenient way comprises stirring the particles for about one hour in a hot (about 90° C. for example) aqueous solution of a magnesium salt such as magnesium chloride. Magnesium chloride solutions of various concentrations are satisfactory provided sufficient magnesium ions are present to replace calcium ions in the solid silicate with which the base or cation exchange is effected. Good results are obtained with those of 0.5 molar to 1.0 molar concentrations, for example. Likewise the treating solution may contain ions other than magnesium; for example, solutions containing both calcium and magnesium salts, such as certain available brines containing both calcium chloride and magnesium chloride, give worthwhile results in some respects superior to results obtained when using straight magnesium chloride solutions. Several commercial brine solutions are available on the open market in which the ratio of magnesium chloride to calcium chloride varies from about 1:2 to about 1:3 and these or similar mixed salt solutions, for example solutions in which the magnesium to calcium ratio is about one to one, may be utilized as exchange solutions. Also, the treating solution may contain sulfates of magnesium instead of, or in addition to, magnesium chloride.

Use of magnesium sulfate instead of magnesium chloride or in addition to magnesium chloride in the treating solution is satisfactory, and one of the advantages of the method of this invention is that insoluble sulfates formed by reaction of magnesium sulfate of the treating solution with metals of the silicate being treated can be readily removed and need not be left in association with the exchange magnesium silicate to exert a diluent effect and reduce decolorizing effectiveness. These insoluble sulfates form as very finely divided particles having extremely low settling rates as compared to the percolant sized particles of exchange magnesium silicate. By agitating slightly, the insoluble sulfate particles become suspended in the treating liquid and a major portion thereof can be removed by simple decantation of the liquid, leaving the larger exchange magnesium silicate particles behind. Any convenient method can be used in which advantage is taken of the difference in particle size. Thus, the method of this invention permits of use as the treating solution of brines containing magnesium sulfate with production of exchange magnesium silicate final products of high decolorizing effectiveness.

The exchange reaction may be carried out as a one stage batch operation but usually is better conducted in a plurality of successive batch stages, as for example in two, three or more stages using fresh exchange or treating solution at each stage. Particularly when using mixed salt solution of relatively low magnesium to calcium ratio is such successive or multi-stage procedure desirable. The advantage of such treatment resides ont only in degree of completeness as to base exchange but also in certain improvement of percolant adsorbent quality and activity. Continuous countercurrent or semi-countercurrent operation may be desirable.

Other suitable methods or modes of conducting the exchange reaction are possible and are contemplated as being within the scope of the invention. For example, instead of stirring the calcium-magnesium silicate particles in the solution in the manner stated above, the exchange solution may be flowed through a static bed of the silicate particles.

The amount of calcium silicate converted in the exchange reaction to magnesium silicate will vary with the procedure or mode of operation. In typical instances conversions of 80% or more are obtained. In cases where less than 100% conversion is obtained the final products will contain substantial amounts of exchange magnesium silicate and lesser amounts of the precipitated unconverted calcium-magnesium silicate.

The mass of exchange magnesium silicate material resulting from the exchange operation is then filtered, washed and dried. Drying may be conducted under any desirable conditions not destructive to the percolant effectiveness of the product. Prolonged drying at temperatures above about 700° C. is generally destructive to oil-decolorizing activity. Satisfactory drying of small batches may be accomplished by placing the filter-cake in an ordinary laboratory muffle furnace heated to 560° C. and heating therein for about 1 hour, but obviously other suitable drying conditions are possible.

The resulting mass, when sufficiently dried as described, is composed of free-flowing hard granular particles of exchange magnesium silicate adsorbent material particularly desirable in percolation decolorizing methods. As indicated hereinabove, the size of the exchange magnesium silicate particles is determined by the particle size of the calcium-magnesium silicate entering the exchange reaction, and use of percolant size calcium magnesium silicate particles will result in exchange magnesium silicate containing substantially the same sized percolant particles. Thus, by the method of this invention the final adsorbent can be obtained directly in percolant sized particles. In some instances, particularly those in which excessively rapid agitation has been resorted to in the exchange operation, the exchanged product may contain a relatively minor proportion of particles smaller than ordinarily desired in certain percolant methods or for particular purposes. In such cases it may be desirable to screen the material to proper size prior to use.

Returning to a more detailed description regarding the precipitation step which is exemplified hereinabove and with which the present invention is particularly concerned, it will be seen that in this step certain factors of control which affect the decolorizing effectiveness and other properties of the final exchange product are involved.

The proportional amount of magnesium in the precipitated calcium-magnesium silicate must be controlled in order that the final exchange product of the process possess high decolorizing activity and other desired properties. The amounts of magnesium and of calcium in the precipitate correspond to the amounts employed in the reactant solution containing salts of these metals. For the production of final exchange products of high activity such as would be satisfactory in oil decolorizing by the percolant method the calcium-magnesium silicate, and hence the stated reactant solution from which it is prepared, should not contain excessively high proportions of magnesium. Reactant solutions containing 50 mol per cent $MgCl_2$ and 50% mol per cent $CaCl_2$; or 30 mol per cent $MgCl_2$ and 70 mol per cent $CaCl_2$ (as in the above disclosed illustrative example); or 10 mol per cent $MgCl_2$ and 90 mol per cent CaCl₂, when reacted with the alkali metal silicate reactant produce precipitates which can be converted to an exchange product of satisfactorily high oil decolorizing activity, while use of calcium salt solutions containing 70 mol per cent MgCl₂ or higher in the precipitation step result only in final exchange products of low activity which are unsatisfactory for the stated purpose.

Temperature of the reaction mass used during precipitation is also important as affecting decolorizing power of the final product, and this factor is related to, and depends in some instances upon, the proportion of magnesium in the reactant. Best results as respects high decolorizing power of the final product are obtained by precipitation at high temperatures (example, 90° C.) when using in the mixed calcium-magnesium salt reactant solution proportional amounts of magnesium within most of the satisfactory mol per cent range indicated above. Precipitation from hot solutions containing 30 mol per cent MgCl₂ and 70 mol per cent CaCl₂ as in the above disclosed illustrative example or those of lower magnesium content results in final exchange products having high oil decolorizing activity suitable for use in percolant decolorizing methods. When using solutions containing 50 mol per cent MgCl₂ and 50 mol per cent CaCl₂, lower but still satisfactory oil decolorizing power is obtained. However, the decolorizing power is improved somewhat if, when using solutions of the latter named proportions, lower precipitation temperatures are employed, as, for example, room temperature.

Again, the concentrations of the reactant solutions in the precipitation step may be varied from those stated in the specific embodiment hereinabove but must be kept within certain limits for obtainment of desired final adsorbent products. Use of reactant solutions of concentrations ranging from about 0.15 molar to about 0.3 molar result in precipitates of desired physical structure which can be converted to exchange magnesium silicate percolant adsorbents of high decolorizing activity. Solutions of concentrations somewhat below this range, for example 0.10 molar, result in exchange products of sharply lowered decolorizing activity. With increase in the reactant solution concentrations above about 0.3 molar, the physical properties of the precipitated silicate become less desirable in that rapid increase in the proportion of fines to percolant sized particles are obtained upon grinding. Thus, at 0.40 molar concentration the dried and ground precipitates may contain 50% fines; while the percolant sized material also produced can be converted by exchange reaction to exchange magnesium silicate percolant adsorbents of satisfactory decolorizing power, the yield of said adsorbents will be low due to removal of material as fines from the process.

While the overall range of desired concentrations has been hereinabove stated as being from about 0.15 to about 0.3, such may not necessarily be the case in all instances since the desired range of concentrations may vary somewhat with variance of precipitation temperature or other conditions.

In the illustrative disclosure of the precipitation step hereinabove the alkali metal silicate solution and the solution containing calcium and magnesium salts have been indicated as being of equal molarity. While solutions of equal molarity are desirable, it should be understood that the invention is not limited thereto. Reactant solutions of any suitable respective molarities effective to produce in the precipitated silicate material the desired physical properties and capacity for conversion to exchange products of satisfactory decolorizing power and percolant effectiveness may be used.

The ratio of Na₂O to SiO₂ in the sodium silicate used may vary but best results are obtained with a one to four (1:4) molal proportion. When higher ratios of Na₂O to SiO₂ (for example 1:3 to 1:2) are used, the oil decolorizing activity of the ultimate adsorbent product is somewhat lower than is the case when a one to four ratio sodium silicate is used for production of the initial precipitated silicate material.

Likewise, the invention is not to be considered limited to use of the specific calcium and magnesium salt precipitant solution described in the specific embodiment hereinabove. Instead of the mixed chlorides of calcium and magnesium, other salts of these metals may be employed, as for example the sulfates. Also, the mixed salt solution need not consist of pure magnesium and calcium salts; there may be used, for example, certain brine solutions containing in addition to calcium and magnesium other compounds, or other solutions containing calcium and magnesium ions in suitable concentrations and proportions.

One of the advantageous results of the present invention is the provision of exchange magnesium silicate percolant adsorbents particularly resistant to breakdown. As stated hereinabove, this characteristic is an important requisite of percolant adsorbents, particularly when oil decolorizing by percolant methods is the intended use. By use in the exchange reaction of calcium-magnesium silicates prepared from mixed calcium and magnesium salt solutions as described instead of straight calcium silicates, final exchange magnesium products of improved breakdown resistance are obtained. The effect of magnesium in the precipitated material in this respect is indicated by an increase in break-down resistance of the exchange products with use of increased mol percentages of magnesium salt in the precipitant solution to be reacted with alkali metal silicate.

Among other advantages of the invention flowing from the presence of magnesium in the precipitated material is the production of final exchange products having in general higher percolant decolorizing power than those produced from straight calcium silicate precipitates.

While the material resulting from the precipitation step is for convenience referred to herein as "calcium-magnesium silicate," its true chemical structure is not entirely known. This material may be a mixture of calcium silicate and magnesium silicate as such or the same in loose chemical combination, or a complex silicate compound containing both calcium and magnesium in the molecule, or some other form. Therefore, the term "calcium-magnesium silicate" as used herein to describe the product precipitated by the disclosed method is to be given general meaning.

The adsorbent compositions possess the combined properties of high percolant decolorizing power (as will be illustrated in the following tests) and high resistance to breakdown, and are thus useful and desirable in the arts.

A 30–60 mesh exchange magnesium silicate produced according to the method of the invention described hereinabove was tested for its decolorizing effectiveness as a percolant adsorbent for oil decolorization. The oil used in the test was an undecolorized, undewaxed Pennsylvania lubricating oil stock of 26.1 gravity, 50° F. pour point, 550° F. flash (closed cup) and 147 seconds Saybolt viscosity at 210° F. Said oil had an optical density color value of 2620 O. D. as measured by the method of Ferris and McIlvain as described in Industrial and Engineering Chemistry, analytical edition 6, 23 (1934), except that a Bausch and Lomb monochromatic green filter was used as the source of monochromatic light. This oil was first diluted with decolorized Stoddard's solvent to give a solution of 40% oil and 60% Stoddard's solvent by volume. The oil solution was then run slowly through a bed of the adsorbent. The bed consisted of 100 c. c. of adsorbent (measured without tapping), the bed being 21 inches deep. The adsorbent was maintained at approximately 135° F. during filtration of the oil therethrough. When the oil in all of the oil solution which had passed through the filter reached a color corresponding to a 7 A. S. T. M. color as determined by comparison with samples of known color, the run was considered complete. The run required about 4 hours time.

From the amount of oil filtered and the amount of adsorbent used in the test the yield of decolorized oil, exclusive of the solvent, per unit of adsorbent, was computed. The volume ratio, which is the ratio of the volume of decolorized oil, exclusive of the solvent, to the volume of adsorbent used affords a comparison of the activities of adsorbents on a volume basis. These results are summarized in the following table, which includes data obtained by testing as described the exchange magnesium silicate of this invention and also that obtained by testing under the same test conditions an adsorbent which is now commercially used in percolation lubricating oil decolorization. The latter material is designated as adsorbent "A."

| Adsorbent | Volume ratio (volume of decolorized oil to volume of adsorbent used) |
| --- | --- |
| Exchange magnesium silicate of present invention | 2.8 |
| Adsorbent "A" | 1.6 |

The tabulated data show the adsorbent compositions of the present invention to possess very high percolant effectiveness in the decolorization of oils.

Percolant adsorbent compositions according to the invention may, after use in oil decolorizing for example, be readily regenerated by burning. A particular advantage of the invention resides in continued return by regeneration to high oil decolorizing activity. In experimental practice of the invention, it has been found that regeneration by burning entails little, if any, drop in decolorizing activity throughout a number of successive cycles.

I claim:

1. Method for producing a magnesium silicate adsorbent composition effective in percolation decolorization of liquids which comprises reacting in aqueous solution a soluble silicate with calcium and magnesium compounds under controlled conditions to produce a precipitated calcium-magnesium silicate having desired percolant physical properties drying the precipitated calcium-magnesium silicate and treating the dried calcium-magnesium silicate with a solution containing magnesium ions to exchange calcium ions of the calcium-magnesium silicate with magnesium ions.

2. Method for producing a magnesium silicate adsorbent composition effective in percolation decolorization of liquids which comprises reacting in aqueous solution an alkali metal silicate with calcium and magnesium salts under controlled conditions to produce a precipitated calcium-magnesium silicate having desired physical properties, drying the precipitate to produce a hard mass which can be ground to desired particle size, grinding said mass to granular particles and treating said granular particles with an aqueous solution containing a soluble magnesium salt to exchange calcium ions of the calcium-magnesium silicate with magnesium ions.

3. Method for producing a magnesium silicate adsorbent composition effective in percolation decolorization of liquids which comprises adding to a hot aqueous solution of an alkali metal silicate a hot aqueous solution containing both calcium and magnesium salts and maintaining the resulting reaction mass hot to precipitate a calcium-magnesium silicate having desired physical properties, drying the calcium-magnesium silicate to produce a dried product which can be reduced to desired particle size, reducing the dried product to desired particle size, then treating the resulting calcium-magnesium silicate in solid particle form with a solution containing magnesium ions to exchange calcium ions of the calcium-magnesium silicate with magnesium ions.

4. Method for producing a magnesium silicate adsorbent composition effective in percolation decolorization of liquids which comprises reacting an aqueous solution of an alkali metal silicate with an aqueous solution containing a magnesium salt in amount not substantially greater than 50 mol per cent and a calcium salt to produce a calcium-magnesium silicate having desired physical properties, filtering and drying the resulting filter-cake to produce a dried mass, grinding and sizing the dried mass to percolant sized particles, treating the resulting calcium-magnesium silicate particles with a solution containing magnesium ions to exchange calcium ions of the calcium-magnesium silicate with magnesium ions.

5. Method for producing a magnesium silicate adsorbent composition effective in percolation decolorization of liquids which comprises reacting an aqueous solution of an alkali metal silicate with an aqueous solution containing about 30 mol per cent magnesium chloride and about 70 mol per cent calcium chloride under controlled conditions to produce a precipitate containing calcium-magnesium silicate having desired physical properties, filtering, washing and drying the precipitate to produce a dried material, reducing the dried material to percolant sized particles containing calcium-magnesium silicate and treating the said particles with a solution containing magnesium ions to exchange calcium ions of the calcium-magnesium silicate with magnesium ions.

6. Method for producing a magnesium silicate adsorbent composition effective in percolation decolorization of liquids which comprises reacting a hot aqueous solution of sodium silicate of a concentration between 0.15 molar and 0.3 molar with a hot aqueous solution containing both magnesium chloride and calcium chloride in combined concentration of from about 0.15 molar to about 0.3 molar and in proportional amounts not substantially greater than 50 mol per cent of magnesium chloride to 50 mol per cent of calcium chloride to produce a calcium-magnesium silicate precipitate having desired physical properties, filtering, washing and drying the precipitate to produce a hard mass grindable to desired particle size, reducing said mass to desired particle size and subjecting the particulated material to cation or base exchange reaction by treatment with a suitable solution containing magnesium ions to convert a substantial portion of the calcium-magnesium silicate to exchange magnesium silicate.

7. A magnesium silicate composition adapted for use as a percolant adsorbent comprising exchange magnesium silicate produced in base exchange reaction by treating with an aqueous solution containing magnesium ions a precipitated calcium-magnesium silicate material sufficiently dried after its precipitation as to be grindable to granular particles and characterized by potentially active percolant adsorbent structure activatable by said base exchange treatment.

8. Method for decolorizing oils comprising passing the oil to be decolorized through a bed of granular particles of the magnesium silicate composition defined by claim 7.

9. An exchange magnesium silicate composition having oil decolorizing activity and specially characterized by physical properties including a hard granular structure making it suitable for percolation oil filtration, said composition having been prepared by precipitating under controlled conditions a calcium-magnesium silicate material, drying said material and then treating the dried material with an aqueous solution containing magnesium ions to exchange calcium ions of the calcium-magnesium silicate with magnesium ions.

CHAS. C. WINDING.